356-336 SR
3/5/87 09 000,267

United States Statutory Invention Registration [19]

[11] Reg. Number: H267
[43] Published: May 5, 1987

Carlton et al.

[54] METHOD AND APPARATUS FOR IMPROVED GAS MASK AND FILTER TEST PENETROMETER

[75] Inventors: Hugh R. Carlton, Joppa; Bernard V. Gerber, Randallstown, both of Md.

[73] Assignee: The United States of America as represented by the Secretary of the Army, Washington, D.C.

[21] Appl. No.: 920,093

[22] Filed: Oct. 17, 1986

Related U.S. Application Data

[63] Continuation-in-part of Ser. No. 683,105, Dec. 18, 1984.

[51] Int. Cl.[4] ..... G01N 15/02; G01J 4/00
[52] U.S. Cl. ..... 356/336; 356/367

*Primary Examiner*—Stephen C. Buczinski
*Assistant Examiner*—Linda J. Wallace
*Attorney, Agent, or Firm*—Anthony T. Lane; Harold H. Card, Jr.; Michael C. Sachs

[57] ABSTRACT

An accurate, instantaneous determination of geometric standard deviation $\sigma g$ of particle size distribution of aerosols, permitting verification that the test aerosols fall within suitable specifications and are giving test results that are truly representative of the degree of protection from smoke and aerosols that representative mask filters and filter media afford under actual use conditions. Provided herein is a more precise means of measuring aerosol penetration of gas masks. Determination of geometric standard deviation includes the steps of transmitting focused and coherent or optically filtered light from a source to a chamber containing an aerosol sample and then detecting and comparing the intensity of polarized light scattered at a first angle relative to said light source to the intensity of polarized light scattered at a second angle relative to said light source. Angles are selected to optimize signal-to-noise of the instrument, not as historically done to optimize ratios of one signal to the other as determined by calculation but whose measurement angles do not correspond to maximum strengths of the individual signals. The first and second detector angles as determined by this new method can by selected by manual adjustment of a pivoted detector, or by two or more detectors permanently affixed at two or more preselected angles, or automatically to compensate for changes in particle size when test aerosols of a constant size connot be continuously generated.

4 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD AND APPARATUS FOR IMPROVED GAS MASK AND FILTER TEST PENETROMETER

GOVERNMENTAL INTEREST

The invention described herein may be manufactured, used and licensed by or for the Government for governmental purposes without payment to us of any royalties thereon.

CONTINUING DATA

This application is a continuation-in-part of application Ser. No. 683,105, filed Dec. 18, 1984, entitled "Method and Apparatus for Improved Gas Mask and Filter Test Penetrometer," by Carlon and Gerber.

BACKGROUND OF THE INVENTION

1. Technical Field

The application relates to a method and apparatus for use in measuring the penetration of military gas masks (respirators), filters and filter media by test aerosols, and more particularly to an optical device which employs polarized light for measuring the size spread parameter $\sigma g$ of the test aerosol used in the penetration measurements of said devices.

Sigma ($\sigma$) is defined, in basic statistics texts e.g., as the standard deviation of a statistical distribution, in this case of aerosol particle sizes; the subscript "$g$" indicates that aerosol particle size here follows a natural geometric-shaped, standard distribution.

2. Description of the Prior Art

Methods and apparatuses in accordance with the prior art are known to exhibit certain shortcomings and problems which have existed at least since World War II, but the technology has its beginnings in mask testing in the World War II era and before. Among the systems of the prior art is a polarimeter system known as the "OWL", developed at about the time of World War II. This system provided for the testing of gas masks by oil droplet smokes which were size-characterized by measurements of the polarization of the light scattered by the oil droplets. It was attempted to obtain uniformly sized droplets of 0.3 $\mu$m for mask testing, and to verify average droplet size continuously using the "OWL" system. The $\sigma g$ was not measured.

More recently, an updated polarimeter system utilizing newer technology, including a laser light source, has been developed. However, the new system has stability problems and, in addition cannot resolve the geometric standard deviation, $\sigma g$, of the test aerosol size distribution for values of more than about 1.2. However, such narrow distributions are difficult to produce. Therefore it is desirable to measure and resolve $\sigma g$ for cases greater than 1.2. Ability to measure and resolve $\sigma g$ up to about 1.5 would be most useful since particle size distributions with this value are achievable and common through thermal generation using liquids, such as dioctyl phthalate (DOP).

SUMMARY OF THE INVENTION

It has now been found that the problems encountered with the prior art systems can be overcome through the use of a novel measuring method and device which provides for the measuring of signal differences as compared to the measurement of the ratio of polarization signals.

The instant invention provides for the accurate determination of the $\sigma g$ of the particle size distribution of the test aerosols, thus permitting verification that the test aerosols fall within suitable specifications and are giving penetration data that are truly representative of the degree of protection from smoke and aerosols that the masks and other filtering devices afford under actual use conditions. The method of the instant invention thus provides a more reliable means of measuring the aerosol penetration of gas masks.

In accordance with the present invention, the preferred method comprises the steps of transmitting focused and coherent or optically filtered light from a source to a chamber containing an aerosol sample and then detecting the intensity of polarized light scattered at a first angle relative to said light source, in a first plane and in a second plane perpendicular to said first plane and determining the difference of intensities of the light in said first plane and in said second plane. The intensity of light scattered at a second angle relative to said light source, in a first plane and in a second plane perpendicular to said first plane is detected and then the difference of *intensities* of the light in said first plane and in said second plane is determined. The second angle is a reference angle relatively insensitive to $\sigma g$.

For the test standard average particle size of 0.3 $\mu$m diameter, the first angle is preferably in the range from about 20 degrees to about 60 degrees and the second angle is preferably in the range from about 80 to about 90 degrees and specifically is about 84 degrees.

BRIEF DESCRIPTION OF THE DRAWINGS

The objects and advantages of the invention will become more apparent and more readily understood when the following detailed description of the invention is read in conjunction with the drawings herein.

DESCRIPTION OF THE INVENTION INCLUDING THE BEST MODE

The device of the present invention provides for an improvement in the measurement of the $\sigma g$ of the size distribution of the particles used as the test aerosol to challenge military gas mask filters and filter media which are tested at the time of manufacture or in scheduled inspections after they are placed in use.

Figure 1:
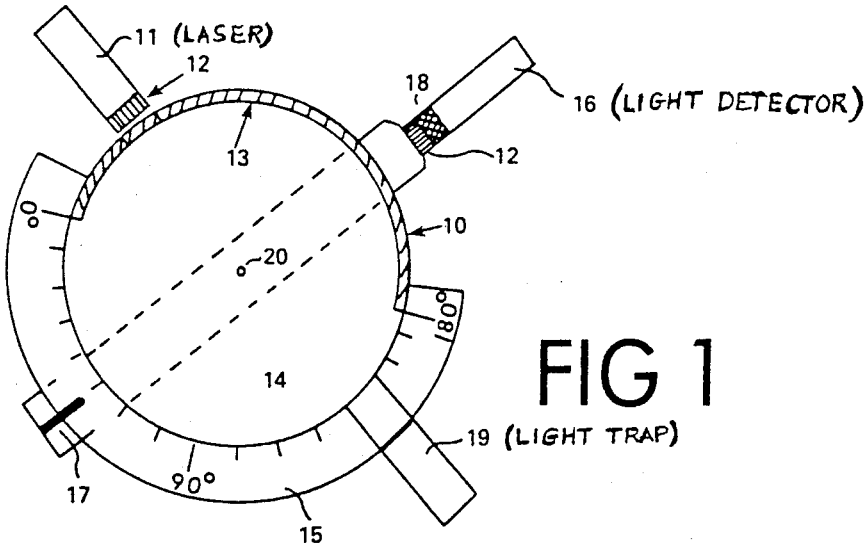
FIG. 1 is a cross sectional top view of an aerosol polarimeter.

FIG. 1 illustrates the principles of operation of a basic manually operated aerosol polarimeter. A focused lamp or laser 11 is directed through an optical window or filter 12 thence through a semicircumferential optical window 13 and into a chamber 14 containing a static or flowing aerosol sample whose geometric standard deviation, $\sigma g$, is to be determined. Light is scattered by the aerosol in all directions with varying intensity. A graduated angular scale 15 surrounds half of the chamber 14 at its exterior. The scale 15 can be used to read the angle that is formed between the lamp or laser 11 and a telescope or light detector 16, the latter being fitted to a pivot 20 positioned under the center of the chamber 14 having a scale pointer 17 on the scale 15 to indicate the angle. The light scattered after passing through an optical window or filter 12 at any angle passes to the light detector 16 through a rotatable polarizer 18, or similar device, which can be used to examine the polarization characteristics of the scattered light with respect to a vertical or horizontal plane. A light trap 19 is provided to capture the relatively intense forward-scattered light, thus reducing the risk of reflecting light in chamber 14 which could confuse readings by the light detector 16 of the desired, angularly-scattered light from the test aerosol.

By setting the light detector 16 at any angle to the lamp or laser 11 as indicated by the light detector pointer 17 on the graduated scale 15, it is then possible to examine the intensity of the light scattered by the test aerosol at this angle as a function of the angular setting of the detector. Usually, only two components of the polarized, scattered radiation (light) need be examined whose planes are mutually perpendicular. Of these components one, of intensity $i_l$, has its light vibrations perpendicular to the plane of observation; the other, of intensity $i_2$, has its light vibrations parallel to the plane of observation. Thus, the polarizer 18 need be set only in the 0 degree or 90 degree angles in front of the light detector 16 for a given angular setting between the light detector 16 and the lamp or laser 11. It is conventional to report the polarization ratio $i_2/i_l$ as a function of the scattering angle between the lamp or laser 11 and the light detector 16, where this angle is actually given as 180 degrees minus the measured angle as in FIG. 2. Such plots vary greatly between aerosols of differing $\sigma g$ as can be seen for example, in FIG. 2 for DOP aerosols of 0.3 $\mu$m mean diameter at a helium cadmium laser wavelength of 0.4416 $\mu$m.

Figure 3:
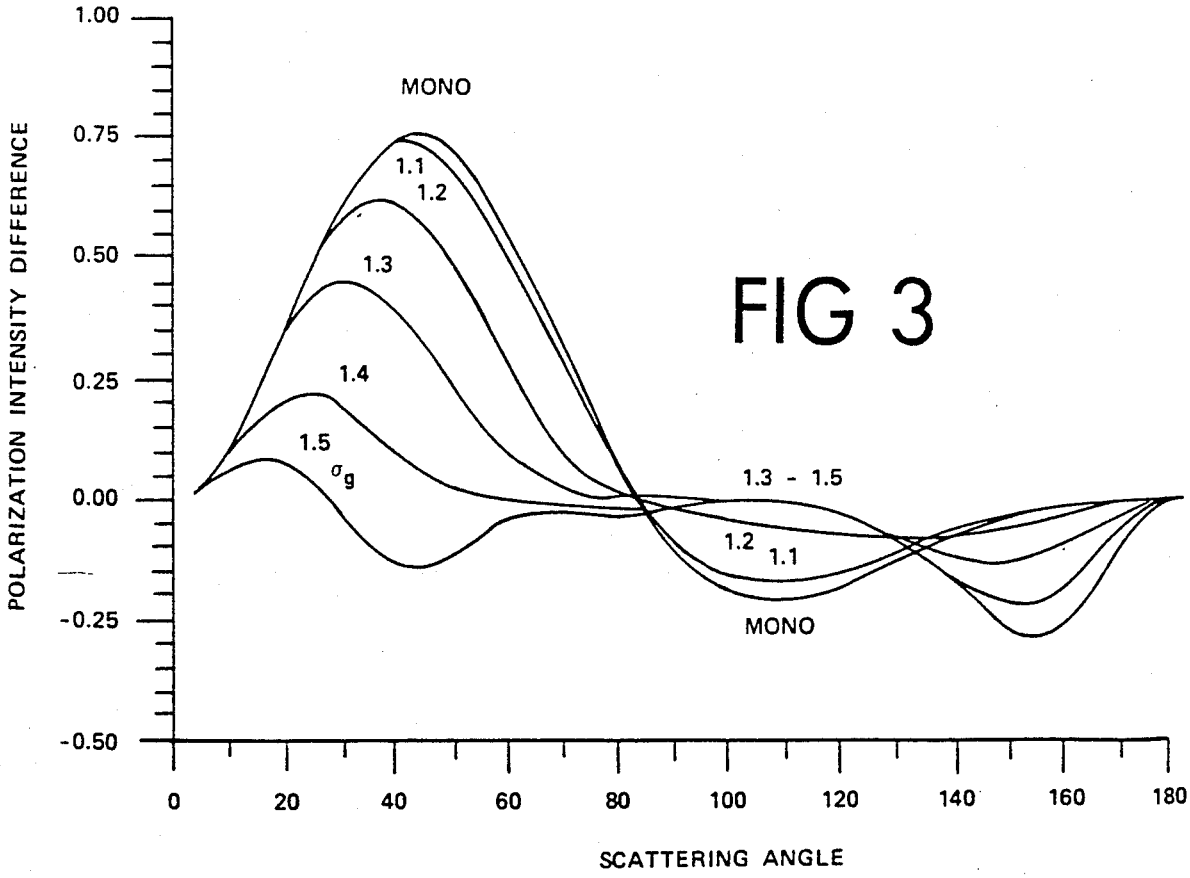
FIG. 3 is a graph indicating the difference in the intensities of the polarized scattered light in the mutually perpendicular first and second planes versus scattering angle. This difference is the basis of the instant invention.
Figure 2:
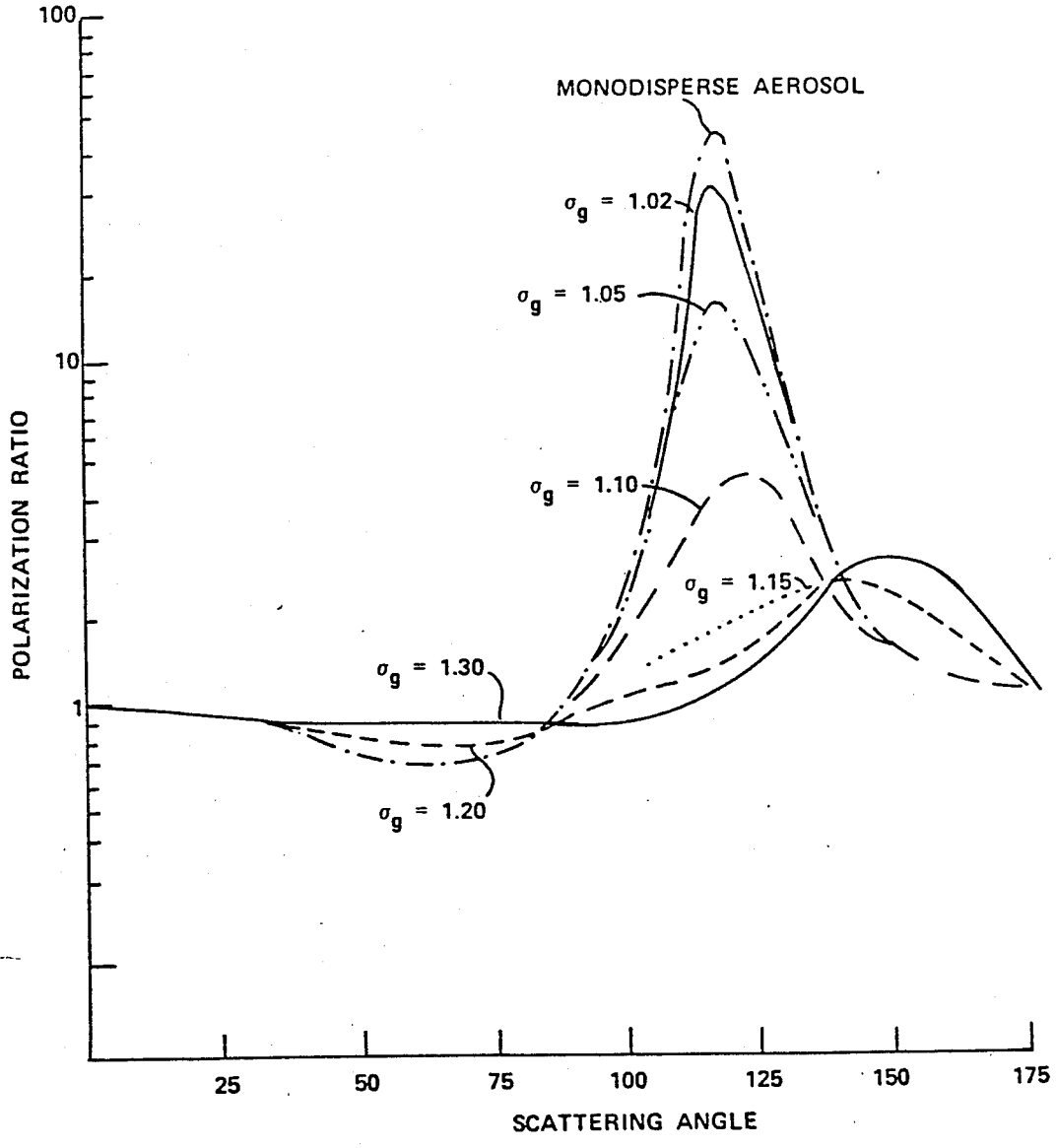
FIG. 2 is a graph indicating the ratio of the intensities of the polarized scattered light in the mutually perpendicular first and second planes commonly called the polarization ratio, versus the scattering angle.

In FIGS. 2 and 3, the scattering angle is defined as 180 degrees minus the measured angle.

In relation to FIG. 2, it should be noted that if a polarimeter like that in FIG. 1 was operated at scattering angles of 84 degrees and 115 degrees, the greatest possible effect would be measured for the aerosol samples. At 84 degrees in FIG. 2, all of the curves cross and thus $\sigma g$ has no effect on the measured polarization ratio $i_2/i_l$. But at 115 degrees, which corresponds to the peaks of the curves in FIG. 2, the maximum sensitivity of ratio to $\sigma g$ is achieved. Thus, instead of a movable detector system as in FIG. 1, a system using two detectors fixed at scattering angles of 84 degrees and 115 degrees, with their output voltages ratioed, would give an immediate indication of $\sigma g$ of the test aerosol. Such techniques are, in fact, used in prior art. It should be noted, however, in FIG. 2, that sensitivity is lost (the curves being flattened) for $\sigma g$'s of about 1.2 or more. Thus, the polarization ratio method as utilized in prior art does not provide sufficient sensitivity to measure $\sigma g$'s of 1.2 or larger values. By way of contrast, the instant apparatus and method provide the means to obtain the desired sensitivity.

The defect in the prior art use of the polarization ratio method resides in the fact that although the ratios of polarization intensities ($i_2/i_l$) in FIG. 2 can be enormous, the light intensities themselves can be quite weak compared to detector noise and other instrumental effects. The prior art use of the ratio of intensities, rather than their absolute magnitudes limits the $\sigma g$ detection sensitivity of 1.2 or less. This is illustrated by FIG. 3 which is calculated for exactly the same conditions as FIG. 2 with the exception that the vertical axis (ordinate) in FIG. 3 represents the difference in the intensities of the vertically and horizontally polarized scattered light, while FIG. 2 represents their ratios. It is clear from FIG. 3 that in terms of actual energy that can be detected by the light detector 16 of FIG. 1, or by multiple detectors placed at selected angles, the scattering angle 115 degrees used in prior art penetrometer devices is inferior to smaller angles, for example, 20 to 40 degrees as seen in FIG. 3, although the same reference angle 84 degrees, still can be used. In fact, the measurable energy difference at 30 degree angle (FIG. 3) for $\sigma g = 1.3$ is greater than that at 115 degree angle even for a monodisperse aerosol, the latter being the best achievable by prior art. It can also be seen in FIG. 3 that for an angle of 115 degrees, there is virtually no signal difference for $\sigma g$'s over the entire range 1.3–1.5, thus accounting for the insensitivity of prior-art systems.

GLOSSARY

| Reference Number | Description |
|---|---|
| 10 | aerosol polarimeter |
| 11 | lamp or laser |
| 12 | optical window or filter |
| 13 | semicircumferential optical window |
| 14 | chamber |
| 15 | graduated angular scale |
| 16 | light detector |
| 17 | angular scale pointer |
| 18 | rotatable polarizer |
| 19 | light trap |
| 20 | pivot |

To further clarify our invention in other terminology, it is a method of instantaneously measuring the standard deviation, $\sigma g$, of the geometrical distribution of aerosol particle sizes in an aerosol sample, which comprises the steps of: transmitting focused and coherent, or optically filtered, light from a source to a chamber containing an aerosol sample; detecting the true magnitude, being defined as: substantially the magnitude of the intensity, less noise, of the polarized light scattered at a first scattering angle ($A_1$), relative to said light source in a first plane, and also in a second plane perpendicular to said first plane, and determining the difference of said intensities, ($\Delta I_1$), of the polarized light in said first plane and in said second plane; detecting the true magnitude, substantially, less noise, of the intensity of polarized light scattered at a second angle ($A_2$) relative to said light source in a third plane, and also in a fourth plane perpendicular to said third plane, and determining the difference of intensities ($\Delta I_2$) of the polarized light in said third plane and in said fourth plane, said second angle ($A_2$) used because it is a (reference) angle known to be relatively insensitive to particle size; by experimentation, and forming the ratio ($\Delta I_2/\Delta I_1$) which turns out to be equal to the $\sigma g$ quantity sought. This method is available when the "first angle" is 80–90 degrees with "second angle" 20–40 degrees; when the "first angle" is 80–90 degrees with "second angle" 20–60 degrees; and when the "first angle" is equal to 84°. Means for filtering/removing noise from the electrical signal representing the detected magnitude of light intensity, already exist in the electrical arts.

What is claimed is:

1. Method of instantaneously, measuring the standard deviation, $\sigma g$, of the geometrical distribution of aerosol particle sizes in an aerosol sample, comprising the steps of:

a. transmitting focused and coherent, or optically filtered, light from a source to a chamber containing an aerosol sample;

b. detecting the magnitude of the intensity of polarized light scattered at a first scattering angle ($A_1$), relative to said light source in a first plane, and also in a second plane perpendicular to said first plane, and determining the difference of said intensities, ($\Delta I_1$), of the polarized light in said first plane and in said second plane;

c. detecting the magnitude of the intensity of polarized light scattered at a second angle ($A_2$) relative to said light source in a third plane, and also in a fourth plane perpendicular to said third plane, and determining the difference of intensities ($\Delta I_2$) of the polarized light in said third plane and in said fourth plane, said second angle ($A_2$) being a reference angle relatively insensitive to particle size; and d. forming the ratio ($\Delta I_2/\Delta I_1$), which is equal to the $\sigma g$ sought.

2. The method of claim 1, wherein said first angle is 80 to 90 degrees and said second angle is 20 to 40 degrees.

3. The method of claim 1, wherein said first angle is 80 to 90 degrees and said second angle is in the range from about 20 to about 60 degrees.

4. The method of claim 3, wherein said first angle equals 84°.

* * * * *